United States Patent
Kawata

(10) Patent No.: US 6,313,900 B1
(45) Date of Patent: Nov. 6, 2001

(54) LCD WITH ANTI-MOISTURE CONDUCTIVE GUARD RING

(75) Inventor: Hirotaka Kawata, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/323,484

(22) Filed: Jun. 1, 1999

(30) Foreign Application Priority Data

Jun. 11, 1998 (JP) .................................................. 10-163972
Mar. 23, 1999 (JP) .................................................. 11-077899

(51) Int. Cl.[7] .................................................. G02F 1/1339
(52) U.S. Cl. .................................................. 349/153; 349/40
(58) Field of Search .............................. 349/40, 149, 150, 349/152, 153

(56) References Cited

U.S. PATENT DOCUMENTS 5,373,377 * 12/1994 Ogawa et al. ........................... 359/59
5,841,490 * 11/1998 Matsuo .................................... 349/40

* cited by examiner

Primary Examiner—James A. Dudek
Assistant Examiner—Andrew Schechter
(74) Attorney, Agent, or Firm—Oliff & Berridge, PLC

(57) ABSTRACT

In conventional reflective-type liquid crystal panels (liquid crystal panels) using semiconductor substrates, a silicon nitride film cannot be used as a passivation film because inconsistencies in the thickness of the silicon nitride film greatly varies the reflectivity in the visible light range. Therefore, there is a problem with moisture resistance of reflective-type liquid crystal panels, which is disadvantageous. A guard ring is constructed using all the conductive layers lying below a reflecting electrode of a reflective-type liquid crystal panel, and the guard ring is directly converted with a moisture resistant insulating film.

15 Claims, 8 Drawing Sheets

LCD WITH ANTI-MOISTURE CONDUCTIVE GUARD RING

BACKGROUND OF THE INVENTION

1. Field of Invention

The present invention relates to the configuration of a substrate on the side of reflecting electrodes which constitutes a reflective-type liquid crystal panel and to a liquid crystal panel using the substrate, and further to an electrode apparatus using the liquid crystal panel.

2. Description of Related Art

Use of transmissive-type liquid crystal panels has been implemented as microminiature a high-definition active matrix liquid crystal panels which are suitable for light valves for projectors or the like, in which thin film transistors (TFTs) are formed on a quartz substrate using polysilicon, and transparent electrodes are formed thereon as pixel electrodes. In the transmissive-type liquid crystal panel using the TFT, since TFT regions provided for the individual pixels, gate electrodes for driving the TFTs, and wiring regions constituting source and drain electrodes are not transmissive regions for transmitting liquid, as the panel resolution increase such as XGA and SXGA, the aperture ratio decreases, which is a fatal detect.

Accordingly, as active matrix liquid crystal panels which can be easily fabricated with a high aperture ratio in comparison with the transmission-type active matrix liquid crystal panels, reflective-type active matrix liquid crystal panels have been proposed, in which pixel electrodes are made as reflecting electrodes and transistors are arranged thereunder. FIG. 9 is a sectional view of a conventional reflective-type active matrix liquid crystal panel, around a scribe line surrounding the exterior of the pixel and peripheral circuit regions. In FIG. 9, numeral 101 represents a p-type semiconductor substrate such as single crystal silicon and numeral 102 represents a p-type well region, having a higher impurity concentration than that of the substrate, formed on the surface of the semiconductor substrate 101. Numeral 102 represents a field oxide film for isolating elements formed on the surface of the semiconductor substrate 101, and numeral 114 represents a gate oxide film formed by thermal oxidation of the surface of the silicon substrate. A first interlayer insulating film 104 is formed on the field oxide film 103 and the gate insulating film 114. On the first interlayer insulating film 104, a first conductive layer 10a, which has been formed simultaneously with a source electrode, is formed. A second interlayer insulating film 108 is formed on the first conductive layer 107a, a second conductive layer 120 is formed as a guard ring on the second interlayer insulating film 108, and the guard ring 120 is connected to the first conductive layer 107a through a via opening formed in the second interlayer insulating film 108. A third interlayer insulating film 110 is formed on the second conductive layer 120, and a third conductive layer 113 formed on the third interlayer insulating film 110 is connected to the second conductive layer 120 through a via opening formed in the third interlayer insulating film 110. An oxide film 111 and a silicon nitride film 121 are formed further thereon.

In the conventional reflective-type active matrix liquid crystal panel described above, a device substrate on which reflecting electrodes are formed must be provided with a passivation film as a protection film having moisture resistance in order to ensure reliability of transistors and wiring metals on the element substrate.

Therefore, is most cases, as shown in FIG. 9, as a passivation film for a element substrate, a silicon nitride film 121 formed by a reduced pressure CVD method or the like is used. As shown in FIG. 9, since the side is exposed when the element substrate is diced, a guard ring 120 which connects all the metal wiring layers is often provided in the periphery of the element. Moisture penetration from the surface of the element substrate can be prevented by the passivation film, and moisture penetration from the dicing side can be prevented by the guard ring.

With respect to the passivation film formed by a CVD method, current techniques cannot prevent the occurrence of uneven thickness of approximately 10%. In the reflective-type liquid crystal panel, if a silicon nitride film forming by a CVD method is used as a passivation film, since the silicon nitride film has a larger refractive index than that of a liquid crystal, because of the inconsistency of the thickness of the silicon nitride film, the reflectivity in the visible light range may vary greatly, which is disadvantageous. Therefore, in the reflective-type liquid crystal panel, the passivation film must be nonexistent or must have a thickness of at most several tons of nanometers.

In a typical liquid crystal panel, a flexible printed circuit (FPC) is used for connecting an element substrate to an external circuit. The FPC contains conductive particles, and the terminal of the element substrate and the terminal of the FPC are connected to each other through the conductive particles. However, if a passivation film is nonexistent on a guard ring of the element substrate or if it is thin, the conductive particles are connected to the guard ring, resulting in short-circuiting between adjacent terminals through the guard ring, which is disadvantageous.

SUMMARY OF THE INVENTION

It is as object of the present invention to provide a high reliable reflective-type liquid crystal panel substrate and a liquid crystal panel having a passivation structure is which reflectivity does not vary greatly.

In order to achieve the object described above, in accordance with the present invention, a liquid crystal panel substrate includes reflecting electrodes formed in a matrix on a substrate and a switching element formed corresponding to each of the reflecting electrodes. A guard ring composed of a conductive layer is disposed in a periphery of the substrate, and the guard ring is directly covered with a moisture resistant insulating film.

Consequently, moisture penetration from the surface and the side of the substrate can be prevented, and thus the reliability of the liquid crystal panel substrate can be improved. Additionally, since a thick insulating film is placed on the guard ring, short-circuiting between terminals will be effectively prevented during mounting after the substrate is fabricated into a liquid crystal panel.

In accordance with the present invention, a liquid crystal panel substrate includes reflecting electrodes formed in a matrix on a substrate and a transistor formed corresponding to each of the reflecting electrodes. A guarding is disposed in a peripheral of the substrate, a first conductive layer of the guard ring is composed of a same material as that of source and drain electrodes of the transistor, a second conductive layer of the guard ring is composed of a same material as that of a shading film formed on the transistor, and the guard ring including the first and second conductive layers is directly covered with a moisture resistant insulating film.

Consequently, moisture penetration from the surface and the side of the substrate is presented, and thus the reliability of the liquid crystal panel substrate is improved. Furthermore, since a thick insulating film exists on the guard ring, short-circuiting between terminals is effectively prevented during mounting after the substrate is fabricated into a liquid crystal panel.

In accordance with the present invention, in the liquid crystal panel substrate, the guard ring may be formed by directly connecting the first conductive layer to the second conductive layer through a via opening. Consequently, the structure can be implemented without increasing the number of steps related to the guard ring, resulting in reductions is cost.

In accordance with the present invention, in a liquid crystal panel substrate, the guarding ring may be formed by connecting the first conductive layer to the second conductive layer through a connecting plug embedded in a via opening. Consequently, the area required for the guard ring can be reduced, and thus a layout within the liquid crystal panel substrate can be made efficiently.

In accordance with the present invention, in a liquid crystal panel substrate according to the above-described embodiments, the moisture resistant insulating film may be a silicon nitride film. Consequently, equipment used in a general semiconductor process can be used, and thus liquid crystal panel substrate can be fabricated at low cost.

In accordance with the present invention, a liquid crystal panel includes a liquid crystal panel substrate according to any of the above-described embodiments and a transparent substrate on the incident side being disposed with a gap therebetween, and a liquid crystal is retained in the gap between the liquid crystal panel substrate and the transparent substrate.

In accordance with the present invention, an electronic apparatus using a liquid crystal panel according to the above-described embodiments is provided. In particular, when the liquid crystal panels are used for portable electronic apparatuses (computers, portable telephones, liquid crystal televisions, electronic watches, portable terminal equipment, and the like) in which reflective-type liquid crystal panels are used as display devices and power is supplied by built-in batteries, display devices having low electric power consumption can be obtained, and thus battery like can be extended. Additionally, when the liquid crystal panels are used for projection display devices in which reflective-type liquid crystal panels function as light valves, high image quality can be obtained even in the case of high-definition liquid crystal panels.

In accordance with the present invention, a liquid crystal panel substrate includes reflecting electrodes formed in a matrix on a substrate, a transistor formed corresponding to each of the reflecting electrodes, a guard ring and a terminal disposed in a periphery of the substrate, and a flexible printed circuit (FPC) for connecting the terminal to an external circuit. A first conductive layer of the guard ring and a first conductive layer of the terminal are composed of a same material as that of source and drain electrodes of the transistor, a second conductive layer of the guard ring and a second conductive layer of the terminal are composed of a same material as that of a shading film formed above the transistor, the first and second conductive layers of the guard ring are converted with a moisture resistance insulating film, and the FPC connected to the terminal extends over the moisture resistant insulating film.

In accordance with such a configuration of the present invention, since the guard ring is covered with the moisture resistance insulating film, moisture penetration from the surface and the side o the substrate can be prevented. Additionally, since the guard ring is covered with the thick insulating film and the FPC is formed on the insulating film, short-circuit between the terminal and the FPC can be prevented.

In accordance with the present invention, a method for fabricating a liquid crystal panel substrate provided with reflecting electrodes formed in a metric on a substrate, a transistor formed corresponding to each of the reflecting electrodes, and a guard ring disposed in the periphery of the substrate, includes the steps of:

forming a first interlayer insulating film in source and drain regions and on a gate electrode of the transistor;

forming a source electrode connecting to the source region and a drain electrode connecting to the drain region through via openings formed in the first insulating film, and a first conductive layer of the guard ring so as to come into contact with the substrate in the peripheral region of the substrate, using the same material;

forming a second interlayer insulating film on the source and drain electrodes and the first conductive layer, using the same material;

forming an interconnecting conductive layer connected to the drain electrical through a via opening formed in the second interlayer insulating film, a shading layer for preventing light leakage between the reflecting electrodes, and a second conductive layer connected to the first conductive layer of the guard ring, using the same material;

forming a third interlayer insulating film, which includes a silicon nitride film and a silicon oxide film on the silicon nitride film, on the interconnecting conductive layer, the shading layer, and the second conductive layer so as to come into contact with the shading layer and the second conductive layer; and forming a reflecting electrode so as to be connected to the interconnecting conductive layer connected to the drain electrode through a via opening formed in the third interlayer insulating film.

In accordance with such a configuration of the present invention, since the guard ring can be fabricated together with the formation of pixels of the liquid crystal panel substrate, the guard ring can be formed without increasing the number of steps. Additionally, since the guard ring is directly covered with a silicon nitride film having high moisture resistance, prevention of moisture penetration can be ensured.

DETAILED DESCRIPTION OF REFERRED EMBODIMENTS

The embodiment of the present invention will be described with reference to the drawings.

Figure 1:
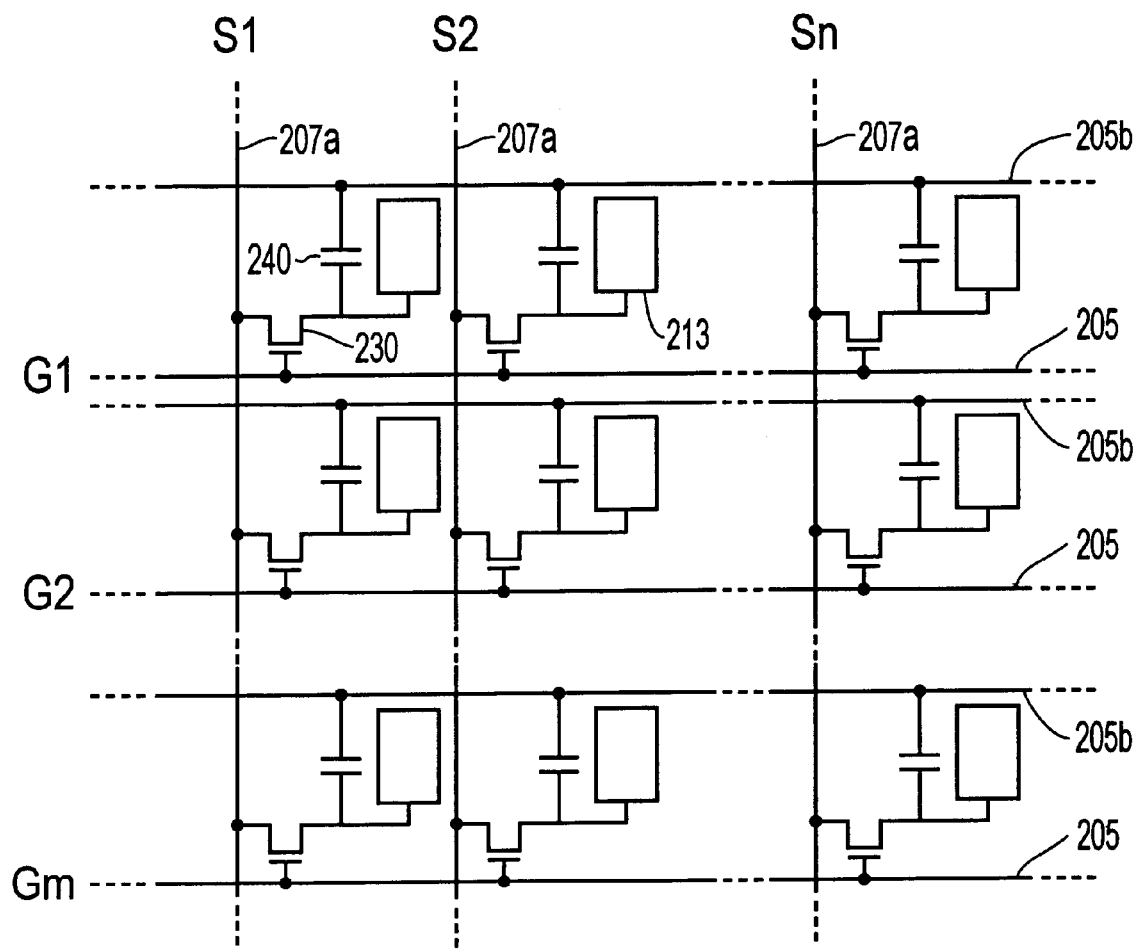
FIG. 1 is an equivalent circuit diagram of the image region of a liquid crystal panel in an embodiment of the present invention.

First, with reference to FIG. 1, the configuration of a liquid crystal panel will be described, FIG. 1 is a equivalent circuit diagram of the pixel region of a liquid crystal panel as an embodiment of the present invention. In FIG. 1, a plurality of pixels formed in a matrix include pixel electrodes (reflecting electrodes) 213 and field effect transistors (switching elements) 230 for controlling the pixel electrodes 213. Data lines (source electrodes) 207a in which image signals are supplied are electrically connected to the switching elements 230, and image signals S1, S2, . . . Sn are supplied to the data lines 207a. To scanning fines (gate electrodes) 205 of the switching elements 230, scanning signals G1, G2, . . . Gm are applied. Pixel electrodes 213 are electrically connected to drain electrodes 207b of the switching elements 230, and the image signals S1, S2, . . . Sn from the data lines 207a are written with predetermined timing. The image signals S1, S2, . . . Sn having predetermined levels, which have been written into a liquid crystal through pixel electrodes 213, are retained in a gap between the panel and an opposite substrate (which will be described later) for a predetermined period. The image signals are retained thereat and a storage capacitor parallel to liquid crystal capacitance formed between the pixel electrodes 213 and the opposite electrode. In this embodiment, as described below, a storage capacitor is formed by a storage capacitor electrode 205b simultaneously formed with the scanning line (gate electrode) 205 as shown in FIG. 2 and an impurity region 206c of the silicon substrate through a gate insulating film.

Figure 2:
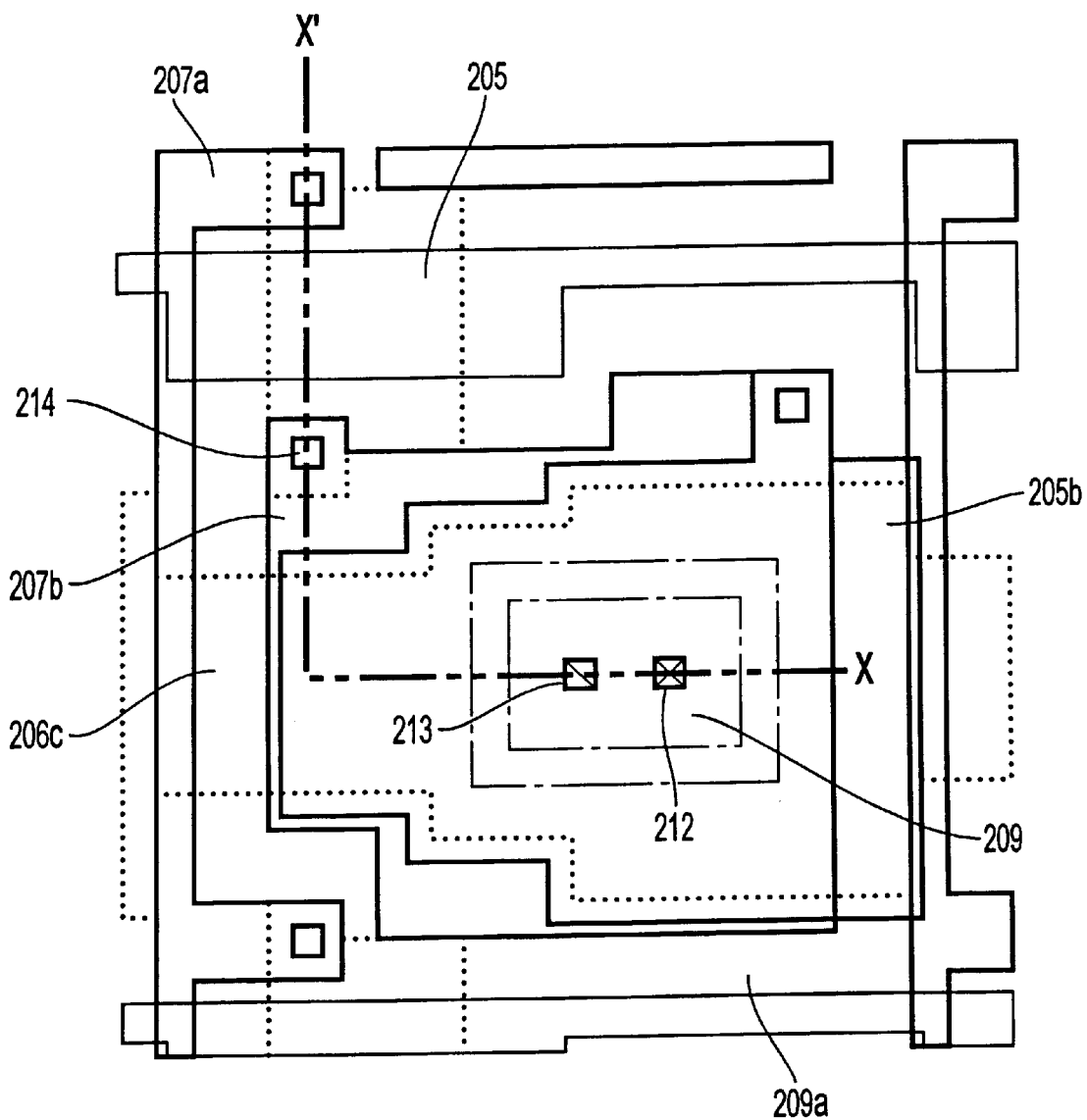
FIG. 2 is a plan view of one pixel region of a substrate on the reflecting electrode side of a reflective-type liquid crystal panel in an embodiment of the present invention.
Figure 3:
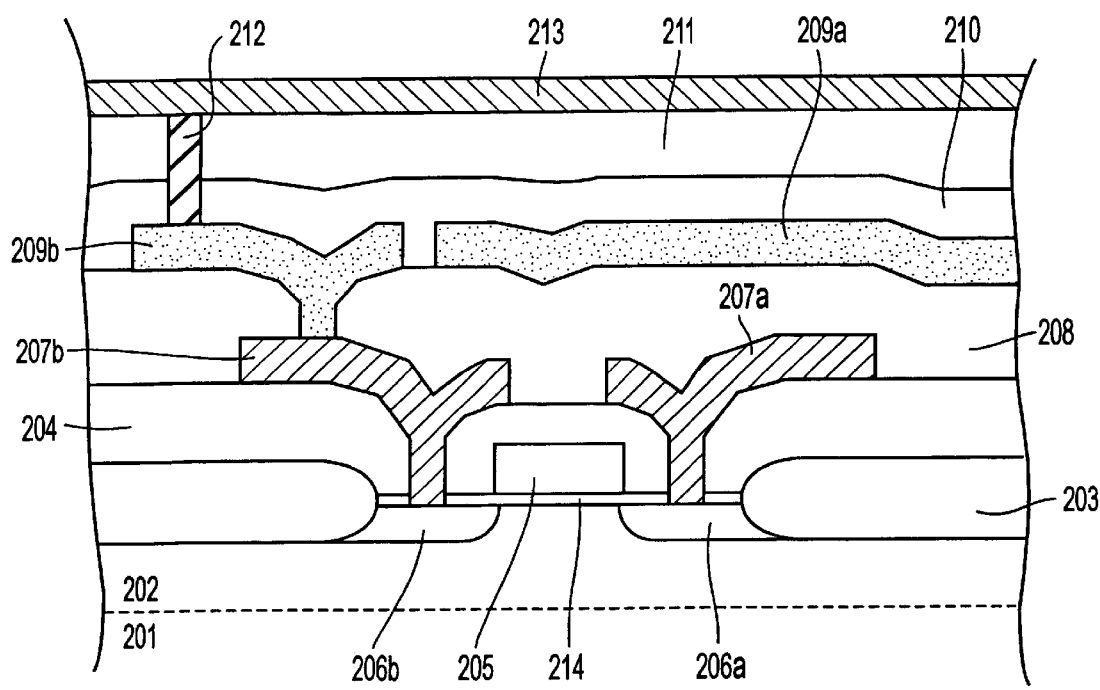
FIG. 3 is a sectional view taken along the line X—X' of FIG. 2.
Figure 4:
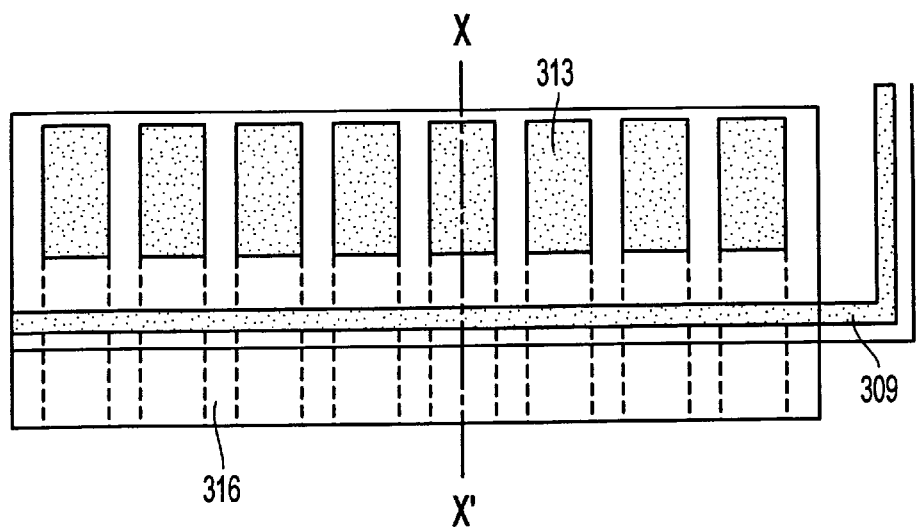
FIG. 4(a) is a plan view showing a guard ring configuration of the substrate on the reflecting electrode side in an embodiment of the present invention.
FIG. 4(b) is a sectional view taken along the line X—X' of FIG. 4(a).
Figure 4:
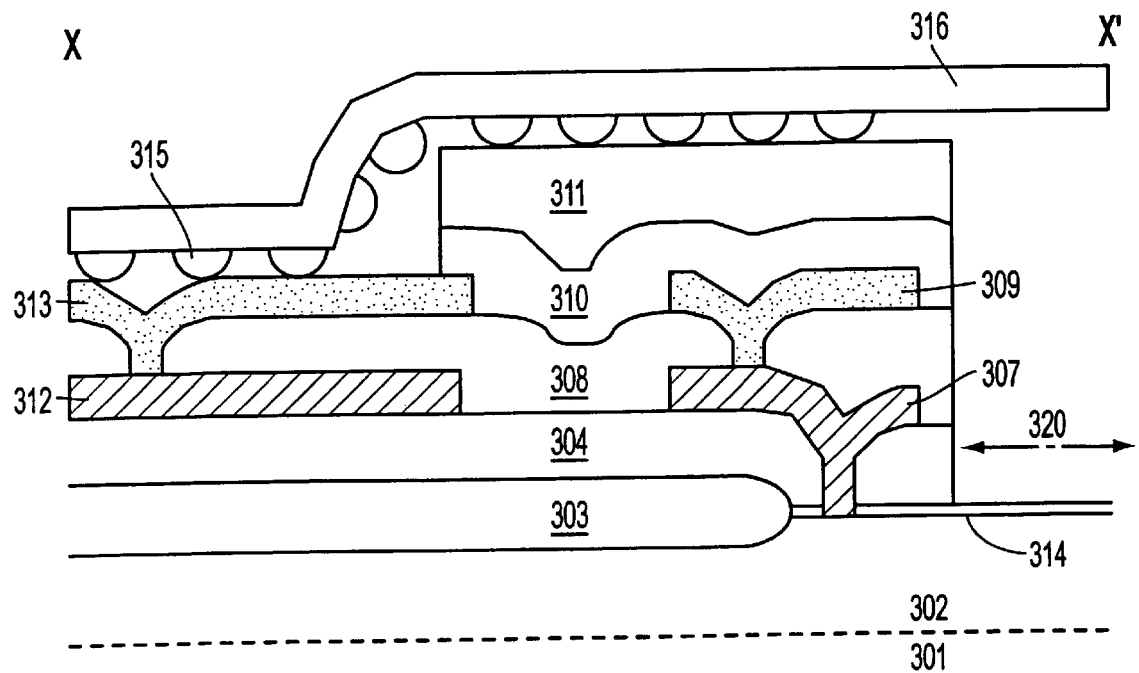
Figure 5:
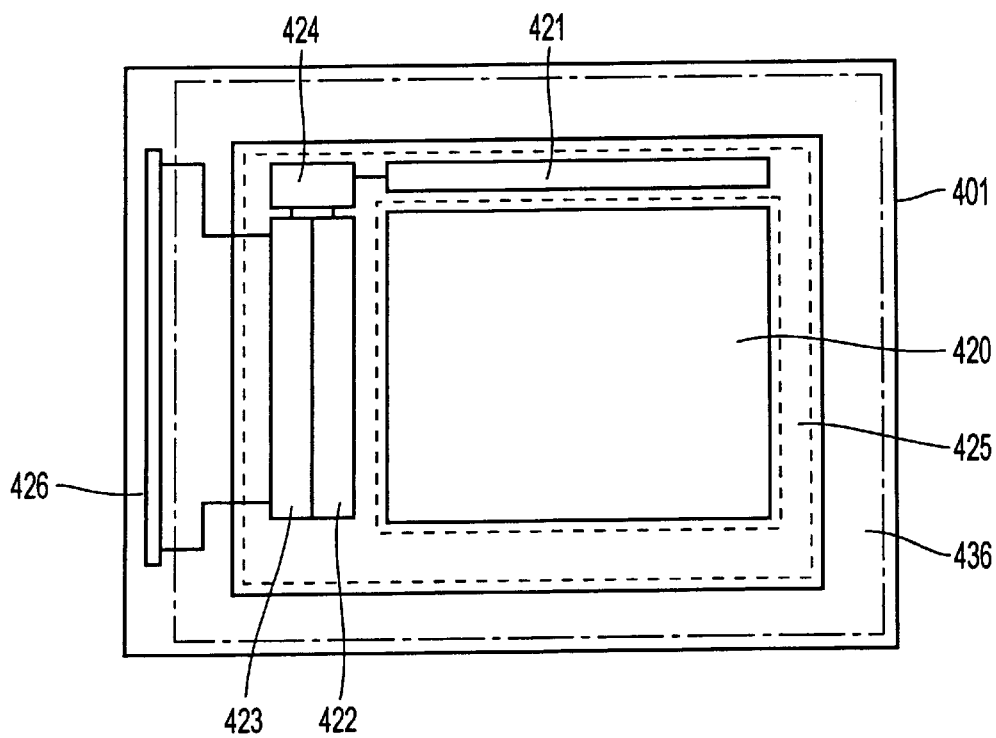
FIG. 5 is a plan view showing an example of a configuration of a substrate on the reflecting electrode side of a reflective-type liquid crystal panel of the present invention.

FIG. 2 is a plan view of one pixel in a liquid crystal panel substrate (substrate on the reflecting electrode side) in this embodiment. FIG. 3 is a sectional view taken along the line X—X of FIG. 2. FIG. 4(a) is a plan view of a peripheral section external to the pixel region and peripheral circuits of the reflective-type liquid crystal panel of the present invention, and FIG. 4(b) is a sectional view taken along the line X—X' of FIG. 4(a). FIG. 5 is a general plan view of a reflective-type liquid crystal panel of the invention, and FIG. 6 is a sectional view of the liquid crystal panel shown in FIG. 5.

A substrate on the reflecting electrode side in this invention uses a semiconductor substrate 201 as shown in FIG. 3. First, the general configuration of the reflective-type liquid crystal panel of the present invention will be described.

Figure 6:
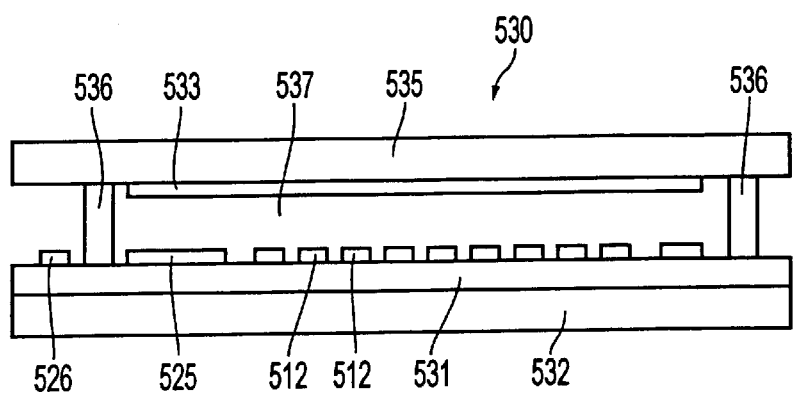
FIG. 6 is a sectional view of a reflective-type liquid crystal panel using the liquid crystal panel substrate of the present invention.

As shown in FIGS. 5 and 6, in the middle of a substrate 401 (531) on the reflecting electrode side, a pixel region 420 is provided, and scanning lines and data lines are arrayed in a matrix in the pixel region. The individual pixels are disposed corresponding to the intersection of the scanning lines and the data lines, and each pixel is provided with a reflecting electrode 512 and a switching element (not shown in the drawing) as described below. In the periphery of the pixel region 420, circuits such as a scanning line driving circuit 422 for supplying scanning signals to scanning lines, a data line driving circuit 421 for supplying data signals to data lines, an input circuit 423 for capturing image data externally input through a pad region 426 (526), and a timing control circuit 424 for controlling these circuits, are disposed. The substrate 401 (531) on the reflecting electrode side and a opposite substrate 535 composed of glass provided with a common electrode 533 on the line surface are adhered to each other with a sealant 536 in a region 436 (a region sandwiched between the solid line and the dotted-chain line), and a liquid crystal 537 is injected into a resultant gap to fabricate a liquid crystal panel. A region 425 (525 in FIG. 5) sandwiched between the dotted lines represents a shading film for shading the periphery of the pixel region. Although not shown in the drawing, a guard ring, which will be described below, is formed exterior to the sealing region 436 of the substrate 401 on the reflecting electrode side.

The sectional construction of the substrate (401, 531) on the reflecting electrode side will be described in detail based on FIG. 3, which is a sectional view taken along the line X—X' of FIG. 2. FIG. 4 is a sectional view of the periphery of a scribe line surrounding the pixel region and the peripheral circuit region, which will be described with FIG. 3. As shown in FIGS. 3 and 4, numeral 201 (301) represents a p-type semiconductor substrate such as single crystal silicon (or may represent an n-type semiconductor substrate), and numeral 202 (302) represents a p-type well region having a higher impurity concentration than that of the substrate and formed on the surface of the semiconductor substrate 201 (301). The well region 202 may be formed as a common well region for, for example, with 768 to 1,024 pixels, although this is not so limited. The well region 202 may be formed being isolated from a well region in the section in which elements constituting the peripheral circuits such as the data line driving circuit 421, the scanning line driving 422, the input circuit 523, and the timing control circuit 424 shown in the plan view of the liquid crystal panel in FIG. 5 are formed. The field oxide film 203 is formed with a thickness of preferably 500 to 700 nm by selective thermal oxidation.

In the field oxide film 203 (303), two openings per pixel are made. In one opening, a gate electrode 205 composed of polysilicon, a metal silicide, or the like is formed through a gate oxide film (insulating film) 214 formed by thermal oxidation, and on the surface of the substrate on both sides of the gate electrode 205, source and drain regions 206a and 206b comprising an n-type impurity layer (hereinafter referred to as the "doping layer"), having a higher impurity concentration than that the well region 202, are formed, and thus a field effect transistor (hereinafter referred to as a "FET") is constructed.

In the other opening formed in the field oxide film 203, a p-type doping region 206c is formed on the surface of the substrate. On the surface of the p-type doping region 206e, a storage capacitor electrode 205b composed of polysilicon, a metal silicide, or the like is formed simultaneously with the gate electrode 205 through a dielectric film formed simultaneously with the gate insulating film formed by thermal oxidation. A storage capacitor for retaining a voltage applied to the pixels is formed between the storage capacitor electrode 205b and the p-type doping region 206c through an insulating film. As shown in FIG. 4(b), the field oxide film 303 is not formed around the scribe line. The gate oxide film 214 is formed by thermal oxidation at a thickness of preferably 40 to 80 nm. The gate electrode 205 and the storage capacitor electrode 205b are formed at a thickness of preferably 100 to 200 nm when they are polysilicon layers, and at a thickness of preferably 100 to 300 nm when they are silicide layers containing a metal having a high melting point. Source and drain regions 206a and 206b are formed in a self-aligned manner by the ion implantation of n-type impurities using the gate electrode 205 as a mask.

A first interlayer insulating film 204 (304 in FIG. 4) is formed over the gate electrode 205 and the field oxide film 203, and on the first interlayer insulating film 204, a data line (source electrode) 207a, a drain electrode 207b, and a first conductive layer 307 in FIG. 4(b), composed of a metal layer containing aluminum as a major constituent, are formed simultaneously. The data line (source electrode) 207a is connected to the source region 206a through a via opening opened in the first interlayer insulating film 204 and the gate oxide film 214, and thus a voltage for data signals is supplied to the source electrode. The drain electrode 207b is connected to the drain region 206b through a via opening opened in the first interlayer insulating film 204 and the gate oxide film 214. As shown in FIG. 4(b), the first conductive layer 307 is in contact with the well region 302 or the substrate through a via opening formed in the first interlayer insulating film 304 and the gate oxide film 314. The via openings described above are formed simultaneously.

A second interlayer insulating film 208 (308) is formed on the source and drain electrodes 207a and 207b and on the first conductive layer 307. The second interlayer insulating film is constructed by forming an insulating film such as silicon dioxide comprising a low temperature oxide (LTO), followed by applying a planarizing film comprising a spin-on-glass (SOG) film, and by forming an insulating film such as an LTO again after a planarization process such as an etch-back is performed. With respect to the source and drain electrodes 207a and 207b, and the first conductive layer 307, for example, the preferable thickness of Ti in the lower layer is 10 to 60 nm. TiN approximately 100 nm, Al 400 to 1,000 mm, and TiN in the upper layer 30 to 60 nm.

On the second interlayer insulating film 208 (308), second conductive layers 209a (conductive layer for preventing light leakage between reflecting electrodes), 209b (interconnecting conducive layer to be connected to the drain electrode), and 309 (conductive layer for a guard ring), comprising a second aluminum layer, are formed simultaneously. The second conductive layer 209b is connected to the drain electrode 207b comprising the first conductive layer through a via opening formed in the second interlayer insulating film 208. The second conductive layer 309 is connected to the first conductive layer 307 through a via opening formed in the second interlayer insulating film 308. The second conductive layers 209a and 209b function as shading layers toward light entering between reflecting electrodes. In FIG. 2, a region surrounded by inner and outer rectangular dotted-chain lines is a region in which the second conductive layers 209a and 209b are not formed. Although not shown in the drawing, in the peripheral circuits, it is possible to use the second conductive layer as wiring of the circuits.

On the second conductive layers 209a and 209b, an insulating film 210 (310) composed of a moisture resistant insulating film such as silicon nitride is formed at a thickness of preferably 100 to 500 nm. An insulating film 211 composed of silicon dioxide or the like comprising an LTO is further formed thereon. The silicon nitride firm and the silicon dioxide film constitute a third interlayer insulating film. The third interlayer insulating film has a thickness of preferably 800 to 12,000 nm. The surface of the third interlayer insulating film is planarized by chemical mechanical polishing (CMP) or the like. The drain electrode 207b is electrically connected to a reflecting electrode 213 as a pixel electrode through a via opening formed in the third interlayer insulating layer and the second conductive layer 209b. The reflecting electrode 213 is composed of aluminum and the surface thereof is planarized. The connection between the second conductive layer 209b and the reflecting electrode 213 is performed by embedding an interconnection plug 212 by a CVD method or the like within a via opening opened in the third interlayer insulating film.

FIG. 4(a) is a plan view of a terminal section (pad region) of the element substrate, and FIG. 4(b) at a sectional view taken along the line X—X' of FIG. 4(a). Along the scribe line 320, the second conductive layer 309 is connected to the first conductive layer 307 through a via opening formed in the second interlayer insulating film 308, and is further connected to the semiconductor substrate 301 through a via opening formed in the first interlayer insulating film 304, and thus a guard ring is constructed. Such a guard ring is formed so as to surround the periphery of the substrate at least once along the sealing region 436. A moisture resistant insulating film 310 composed of silicon nitride or the like is formed on the guard ring, and an insulating film 311 composed of silicon dioxide or the like comprising an LTO is further formed thereon. The insulating film 310 and the insulating film 311 constitute a third interlayer including film. A conductive layer 312 composed of the same layer as that of the first conductive layer 307 and a conductive layer 313 composed of the same layer as that of the second conductive layer 309 are electrically connected to each other to form a pad region. The pad region is connected to an FPC 316 including conductive particles 315, and external signals are supplied to the pad region through the FPC 316. A conductive layer being the same layer as the reflecting electrode 213 is not formed in the pad region.

In this embodiment, the moisture resistant insulting film 310 formed of silicon nitride or the like, which is a lower layer of the third interlayer insulating film, functions as a passivation film. Since the moisture resistant insulating film 310 is in direct contact with the guard ring, it exhibits an excellent shielding function against moisture from the side after dicing, which is thus very effective in improvement in moisture resistance. Additionally, the guard ring includes the first conductive layer 307 and the second conductive layer 309, and a thick insulating film comprising the third interlayer insulating film exists on the guard ring. That is, since the thick third interlayer insulating film is formed between the guard ring and the FPC 316, short-circuiting between terminals can be effectively prevented during mounting after the substrate is fabricated into a liquid crystal panel.

FIG. 5 is a general plan view of a liquid crystal panel substrate (substrate on the reflecting electrode side) 401 in which the foregoing example is employed.

As shown in FIG. 5, in this embodiment, a shading film 425 is provided for preventing light from entering into peripheral circuits formed in the periphery of the substrate. The peripheral circuits are provided around the pixel region 420 in which pixel electrodes are arrayed in a matrix, and include the data line driving circuit 421 for supplying image signals corresponding to the image data to the data lines 207a, the scanning line driving circuit 422 for scanning the scanning lines in sequence, the input circuit 423 for capturing image data externally input through the pad region 426, and the timing control circuit 424 for controlling these circuits. The circuits include pixel electrode switching elements combined with load elements such as resistors and capacitors. Numeral 436 represents a region in which a sealant is disposed for adhering the substrate to an opposing glass substrate.

In this embodiment, the shading film 425 comprises the third conductive layer which is formed in the same step at that of the reflecting electrode (pixel electrode) 213 shown in FIG. 3, and a predetermined potential such as a power supply voltage, a center potential of image signals, or a common LC electrode potential is applied to the shading film 425. By applying a predetermined potential to the shading film 425, reflection can be reduced in comparison with the case of a floating potential or other potentials. Numeral 426 represents a pad region in which a pad or a terminal used for supplying a power supply voltage is formed.

FIG. 6 is a sectional view of the reflective-type liquid crystal panel in which the liquid crystal panel substrate 531 (401 in FIG. 4) is employed. As shown in FIGS. 5 and 6, to the back surface of the liquid crystal panel substrate 531 (401), a supporting substrate 532 composed of glass, a ceramic, or the like is adhered with an adhesive. On the front surface of the liquid crystal panel substrate 531, an incident side glass substrate 535, having an opposite electrode (also referred to as "common electrode") composed of a transparent conductive film (ITO) to which a common LC electrode potential is applied, is disposed with an appropriate gap therebetween. The gap, in which the periphery is sealed with a sealant 536 formed in the sealing region 436 shown in FIGS. 4 and 5, is filled with a known twisted nermatic (TN) liquid crystal, super homeotropic (SH) liquid crystal 537 in which liquid crystal molecules are aligned substantially perpendicularly at a voltage non-applying state, or the like to construct a liquid crystal panel 530. The position at which the sealant 536 is provided is set so that signals are externally input and the pad region 526 (426) lies in the exterior of the sealant 536.

The shading film 525 (425) on the peripheral circuits is configured so as to be opposed to the opposite electrode 533 with the liquid crystal 537 therebetween. When a common LC electrode potential is applied to the shading film 525, since the common LC electrode potential is applied to the opposite electrode 533, a direct voltage is not applied to the liquid crystal interposed therebetween. Thus, in the case of a TN liquid crystal, liquid crystal molecules always remain twisted substantially by 90°, and in the case of an SH liquid crystal, liquid crystal molecules always remain aligned perpendicularly.

In this embodiment, since the back surface of the liquid crystal panel substrate 531 comprising a semiconductor substrate is adhered to the supporting substrate composed of glass, a ceramic, or the like by an adhesive, the strength thereof is significantly increased. Consequently, when the liquid crystal panel substrate 531 is attached to the opposite substrate after the supporting substrate 532 is adhered to the liquid crystal panel substrate 531, the gap of the liquid crystal layer is made uniform over the entire panel, which is advantageous.

Next, an example of an electronic apparatus using a reflective-type liquid crystal panel as a display device in accordance with the present invention will be described.

Figure 7:
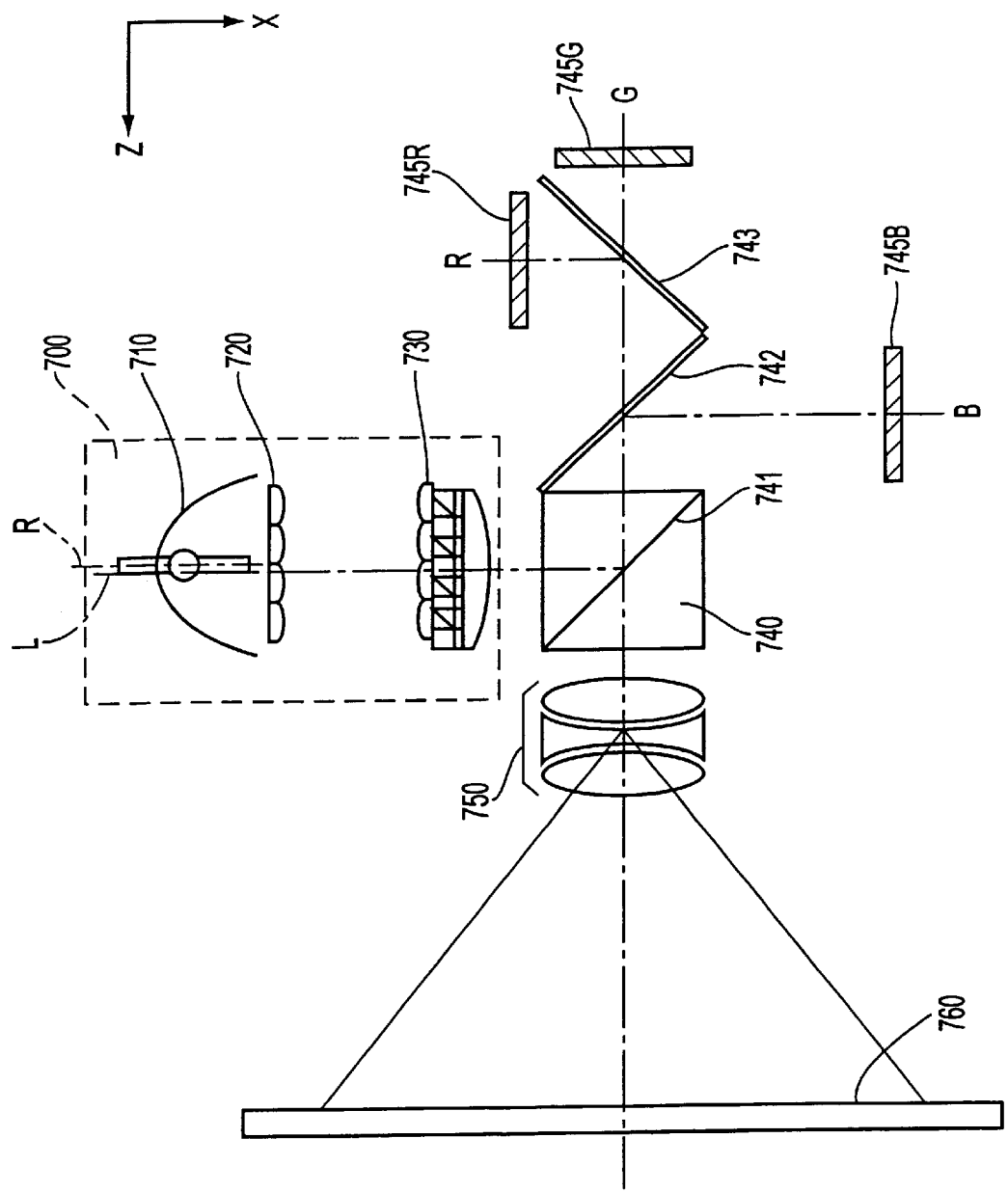
FIG. 7 is a schematic diagram of a projection display device using reflective-type liquid crystal panels of the present invention as light valves.

FIG. 7 is a schematic diagram showing the male portion of a projector (projection display device) using reflective-type liquid crystal panels of the present invention as light valves, which is an example of an electronic apparatus using liquid crystal panels in accordance with the present invention. FIG. 7 is a sectional view taken along the X–Z plane passing through the center of an optical element 750. The projector in this example includes a polarized light illumination apparatus 700 comprising a light source 710, an integrator lens 720, and a polarization converting element 730 disposed along the system optical axis L, a polarized beam splitter 740 for reflecting an s-polarized beam emitted from the polarized light illumination apparatus 700 by an s-polarized beam reflection plane 741, a dichroic mirror 742 for separating a blue light (B) component from a beam reflected from the s-polarized beam reflection plane 741 of the polarized beam splitter 740, a reflective-type liquid crystal light valve 745B for modulating the separated blue light (B), a dichroic mirror 743 for separating a red light (R) component by reflection from a beam in which the blue light component has been separated, a reflective-type liquid crystal light valve 745R for modulating the separated red light (R), a reflective-type liquid crystal light valve 745G for modulating the remaining green light (G) which has passed through the dichroic mirror 743, and a projection optical system 750 for projecting a synthesized beam on a screen 760. The lights modulated by the three reflective-type liquid crystal light valves 745R, 745G, and 745B are synthesized by the dichroic mirrors 743 and 742, and the polarized beam splitter 740. For the three reflective-type liquid crystal light valves 745R, 745G, and 745B, liquid crystal panels described above are used.

The randomly polarized beam radiating from the light source 7310 is divided into a plurality of intermediate beams by the integrator lens 720, and then the intermediate beams are converted into one type of polarized beam (an s-polarized beam) with the substantially aligned polarization direction by the polarization converting element 730 provided with a second integrator lens on the incident side to reach the polarized beam splitter 740. The s-polarized beam emitted from the polarization converting elements 730 is reflected by the s-polarized beam reflection plane 741 of the polarized beam splitter 740, and in the reflected beam, blue light (B) is reflected from the blue light reflecting layer of the dichroic mirror 742 and is modulated by the reflective-type liquid crystal light valve 745B. In the beam which has passed through the blue light reflecting layer of the dichroic mirror 742, red light (R) is reflected from the red light reflecting layer of the dichroic mirror 743 and is modulated by the reflective-type liquid crystal light valve 745R. On the other hand, green light (G) which has passed through the red light reflecting layer of the dichroic mirror 743 is modulated by the reflective-type liquid crystal light valve 745G. In this way, the individual reflective-type liquid crystal light valves 745R, 745G, and 745B modules color light.

Reflective-type liquid crystal panels as reflection-type liquid crystal light values 745R, 745G, and 745B employ a TN liquid crystal (liquid crystal in which major axes of liquid crystal molecules are aligned substantially parallel to the panel substrate in the absence of an applied voltage) or an SH liquid crystal (liquid crystal in which major axes of liquid crystal molecules are aligned substantially perpendicular to the panel substrate in the absence of an applied voltage).

When the TN liquid crystal is employed, in pixels (OFF pixels) in which an applied voltage to the liquid crystal layer sandwiched between reflecting electrodes pixels and a common electrode of an opposite substrate is equal to or less than a liquid crystal threshold voltage, incident color light is elliptically polarized by the liquid crystal layer and is reflected by the reflecting electrode, and thus, is reflected/emitted, through the liquid crystal layer, as light which is close to elliptically polarized light having polarization axis components which are shifted from the polarization axis of the incident color light to approximately 90°. In pixels (OH pixels) in which a voltage is applied to the liquid crystal layer, incident color light reaches the reflecting electrode as it is, and is reflected, and thus, is reflected/emitted maintaining the same polarization axis as that of the incident light. Since the angle of alignment of liquid crystal molecules of the TN liquid crystal changes in response to a voltage applied to the reflecting electrode, the angle of the polarization axis of reflected light in relation to incident light varies with a voltage applied to the reflecting electrode through an FET of the pixel.

When the SH liquid crystal is employed, in pixels (OFF pixels) in which an applied voltage to the liquid crystal layer is equal to or less than a liquid crystal threshold voltage, incident color light reaches the reflecting electrode as it is, and is reflected, and thus, is reflected/emitted maintaining the same polarization axis as that of the incident light. In pixels (ON pixels) in which a voltage is applied to the liquid crystal layer, incident color light is elliptically polarized by the liquid crystal layer and is reflected by the reflecting electrode, and thus, is reflected/emitted, through the liquid crystal layer, as light which is close to elliptically polarized light having polarization axis components which are shifted from the polarization axis of the incident color light by approximately 90°. Similarly to the TN liquid crystal, since the angle of alignment of liquid crystal molecules of the TN liquid crystal changes in response to a voltage applied to the reflecting electrode, the angle of the polarization axis of reflected light in relation to incident light varies with a voltage applied to the reflecting electrode through an FET of the pixel.

In color light reflected from pixels of the liquid crystal panel, s-polarized light components do not pass through the polarized beam splitter 740 for reflecting s-polarized light, and p-polarized light components pass through. An image is formed by the light which has passed through the polarized beam splitter 740. Accordingly, when the TN liquid crystal is sued for the liquid crystal panel, the projected image will be a "normally-white display" since reflected light of OFF pixels reaches the projection optical system 750 and reflected light of ON pixels does not reach the less. When the SH liquid crystal is used, the projected image will be a "normally-black display" since reflected light of OFF pixels does not reach the projection optical system and reflected light of ON pixels reaches the projection optical system 750.

In reflective-type liquid crystal panels, in comparison with active matrix liquid crystal panels in which TFT arrays are formed on glass substrates, since pixels are formed using a semiconductor technique, the number of pixels formed can be increased and the panel size can be decreased, and thus high-definition images can be projected and projectors can be miniaturized.

As described with reference to FIG. 5, since the peripheral circuits of the liquid crystal panel are covered with the shading film and the same potential (for example, a common LC electrode potential, or a peripheral opposite electrode width is isolated from the common electrode in the pixel area since a different potential is applied to the peripheral circuit instead of the common electrode in the pixel area if a common LC electrode potential is not applied) is applied to the peripheral circuits and the common electrode of the opposite substrate at the opposing position, substantially 0 V is applied to the liquid crystal interposing between the two, and thus the liquid crystal is in the same state as in the OFF state. Therefore, in the TN liquid crystal panel, a white display is enabled in the entire periphery of the image region in agreement with the "normally-white display", and n the SH liquid crystal panel, a black display is enabled in the entire periphery of the image region in agreement with the "normally-black display".

In accordance with the embodiment described above, since the voltages applied to the individual pixel electrodes of the reflective-type liquid crystal panels 745R, 745G, and 745B are sufficiently retained and the pixel electrodes have very high reflectivity, a sharp projected image can be obtained.

Figure 8A:
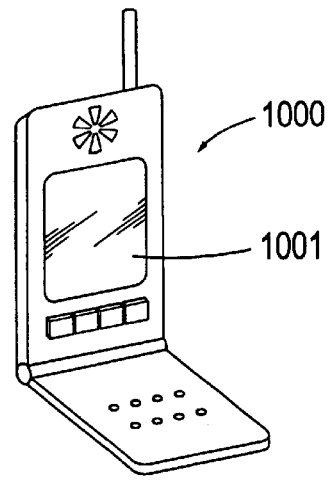
FIG. 8(a) is a schematic representation of a portable telephone.
Figure 8B:
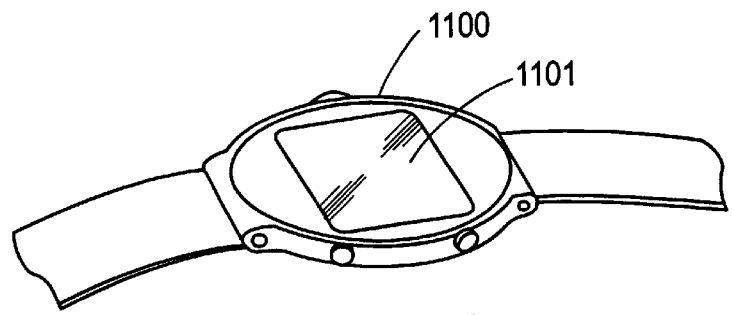
FIG. 8(b) is a schematic representation of a wristwatch-type television.
Figure 8C:
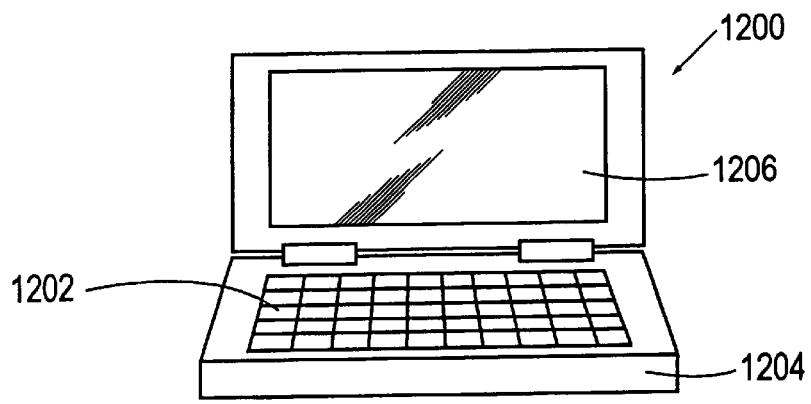
FIG. 8(c) is a schematic representation of a personal computer, in which reflective-type liquid crystal panels of the present invention are used.
Figure 9:
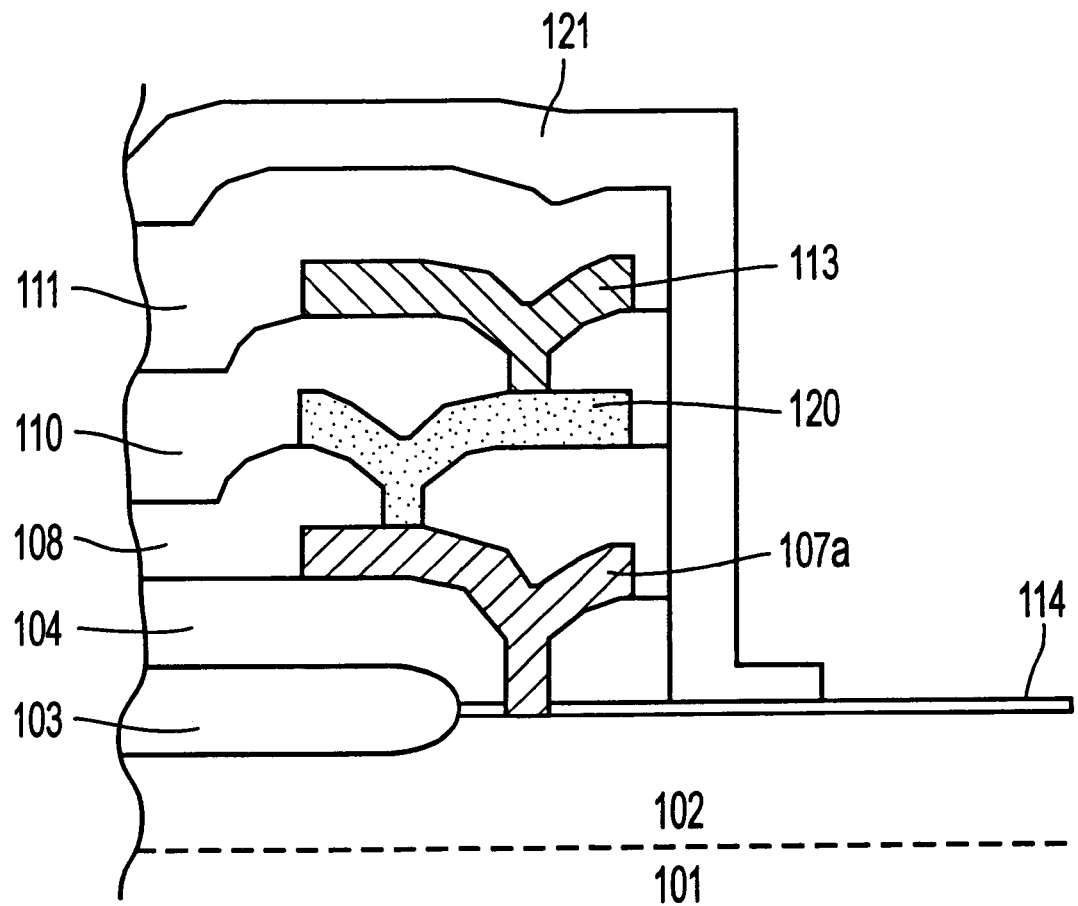
FIG. 9 is a sectional view showing the configuration of a guard ring in a conventional semiconductor.

FIG. 8 is a schematic representation of electronic apparatuses using the reflective-type liquid crystal panels of the present invention. In the electronic apparatuses, since the reflective-type liquid crystal panels are used as direct-view-type reflective liquid crystal panels, not as light valves used with the polarized beam splitter, although it is not necessary that reflecting electrodes have complete specular surface and it is desirable that reflecting electrodes instead have proper unevenness in order to widen the viewing angle, other configurational conditions are basically the same as those of the light valves.

FIG. 8(*a*) is a perspective view of a portable telephone. Numeral 1000 represents a main body of a portable telephone, and numeral 1001 represents a liquid crystal display section using a reflective-type liquid crystal panel of the present invention.

FIG. 8(b) is a diagram showing a wristwatch-type electronic apparatus. Numeral 1100 represents a perspective view of the main body of a wristwatch. Numeral 1101 represents a liquid crystal display section using a reflective-type liquid crystal panel of the present invention. Since this liquid crystal panel has high-definition pixels in comparison with the conventional watch display section, television picture display is also enabled, and thus a wristwatch-type television can be obtained.

FIG. 8(*c*) is a diagram showing a portable information processor such as a word processor or a personal computer. Numeral 1200 represents an information process, numeral 1202 represents an input unit such as a keyboard, numeral 1205 represents a display section using a reflective-type liquid crystal panel of the present invention, and numeral 1204 represents an information processor body. Since the individual electronic apparatuses are driven by batteries, if reflective-type liquid crystal panels without light source lamps are used, battery life can be extended. Additionally, in the present invention, since peripheral circuits can be built in a panel substrate, the number of parts can be significantly reduced, thus enabling further reductions in size and weight.

What is claimed is:

1. A liquid crystal panel substrate, comprising:
   reflecting electrodes formed in a matrix on a substrate;
   a switching element formed corresponding to the reflecting electrodes; and
   a guard ring comprising a conductive layer disposed in a periphery of the substrate, preventing a penetration of moisture from a substrate side edge, the guard ring being directly covered by a moisture resistant insulating film being interposed between the guard ring and an exposed substrate's side edge.

2. The liquid crystal panel substrate according to claim 1, the moisture resistant insulating film being a silicon nitride film.

3. A liquid crystal panel comprising a liquid crystal panel substrate according to claim 1 and a transparent substrate an incident side of the liquid crystal panel, with a gap disposed between the liquid crystal panel substrate and the transparent substrate, and a liquid crystal being retained in the gap between the liquid crystal panel substrate and the transparent substrate.

4. An electronic apparatus comprising a liquid crystal panel according to claim 3.

5. A liquid crystal panel substrate comprising:

reflecting electrodes formed in a matrix on a substrate;

a transistor formed corresponding to each of the reflecting electrodes, the transistor having source and drain electrodes;

a shading film formed above the transistor; and a guard ring disposed in a periphery of the substrate, a first conductive layer of the guard ring formed from a same material as that of the source and the drain electrodes of the transistor, a second conductive layer of the guard ring formed from a same material as that of the shading film formed above the transistor, and the guard ring comprising the first and second conductive layers being directly covered with a moisture resistant insulating film.

6. The liquid crystal panel substrate according to claim 5, the guard ring being formed by directly connecting the first conductive layer to the second conductive layer through a via opening.

7. The liquid crystal panel substrate according to claim 5, the guard ring being formed by connecting the first conductive layer to the second conductive layer through a connecting plug embedded in a via opening.

8. The liquid crystal panel substrate according to claim 5, the moisture resistant insulating film being a silicon nitride film.

9. A liquid crystal panel comprising a liquid crystal panel substrate according to claim 5 and a transparent substrate on an incident side of the liquid crystal panel, with a gap disposed between the liquid crystal panel substrate and the transparent substrate, and a liquid crystal being retained in the gap between the liquid crystal panel substrate and the transparent substrate.

10. An electronic apparatus comprising a liquid crystal panel according to claim 9.

11. A liquid crystal panel substrate comprising:

reflecting electrodes formed in a matrix on a substrate;

a transistor formed corresponding to each of the reflecting electrodes;

a guard ring and a terminal disposed in a periphery of the substrate; and a flexible printed circuit for connecting the terminal to an external circuit;

a first conductive layer of the guard ring and a first conductive layer of the terminal comprise a same material as that of source and rain electrode of the transistor, a second conductive layer of the guard ring and a second conductive layer of the terminal comprise a same material as that of a shading film formed above the transistor, the first and second conductive layers of the guard ring being covered by a moisture resistant insulating film, and the flexible printed circuit connected to the terminal extending over the moisture resistant insulating film.

12. A method for forming a liquid crystal panel substrate comprising:

forming reflecting electrodes formed in a matrix on a substrate;

forming a transistor formed corresponding to each of the reflecting electrodes, the transistor having source and drain electrodes;

forming a shading film above the transistor; and forming a guard ring disposed in a periphery of the substrate, a first conductive layer of the guarding ring formed from a same material as that of the source and the drain electrodes o the transistor, a second conductive layer of the guard ring formed from a same material as that of the shading film formed above the transistor, and the guard ring comprising the first and second conductive layers being directly covered with a moisture resistant insulating film.

13. The method for forming a liquid crystal panel substrate according to claim 12, the step of forming the guard ring further comprising directly connecting the first conductive layer to the second conductive layer through a via opening.

14. The method for forming a liquid crystal panel substrate according to claim 12, the stop of forming the guard ring further comprising connecting the first conductive layer to the second conductive layer through a connecting plug embedded in a via opening.

15. The method for forming a liquid crystal panel substrate according to claim 12, the step of forming the moisture resistant insulating film comprising forming a silicon nitride film.

* * * * *